C. P. LANDRETH.
APPARATUS FOR TREATING SEWAGE OR THE LIKE.
APPLICATION FILED MAR. 16, 1918.
1,412,945.
Patented Apr. 18, 1922.
3 SHEETS—SHEET 1.
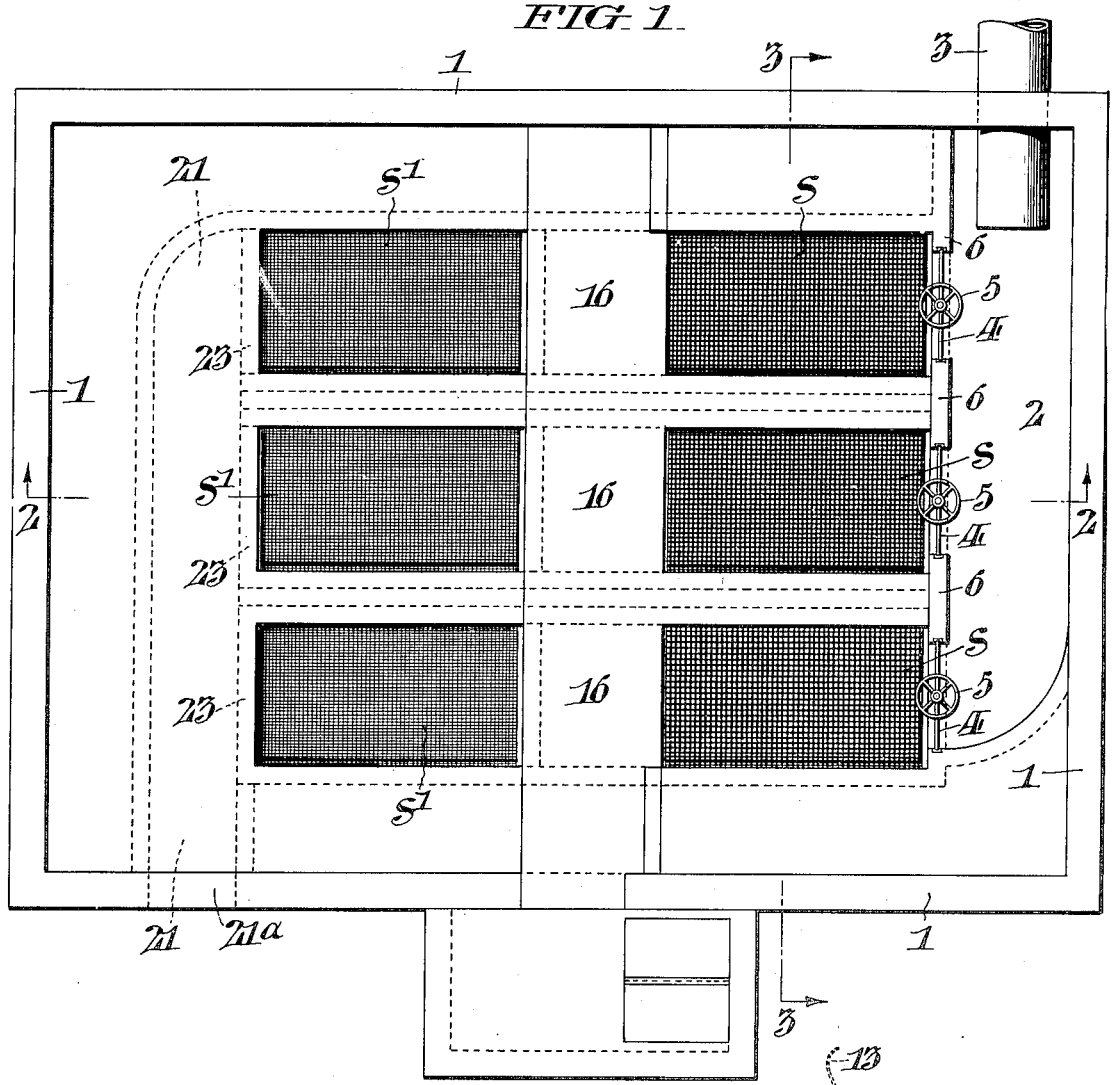
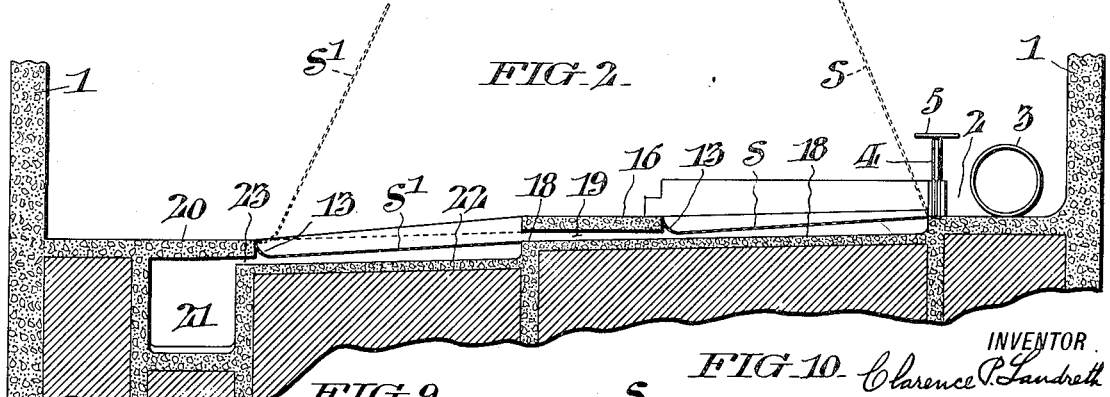
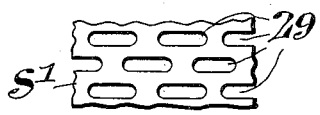
INVENTOR
Clarence P. Landreth
by Cornelius D. Ehret
his ATTORNEY C. P. LANDRETH.
APPARATUS FOR TREATING SEWAGE OR THE LIKE.
APPLICATION FILED MAR. 16, 1918.
1,412,945.
Patented Apr. 18, 1922.
3 SHEETS—SHEET 2.
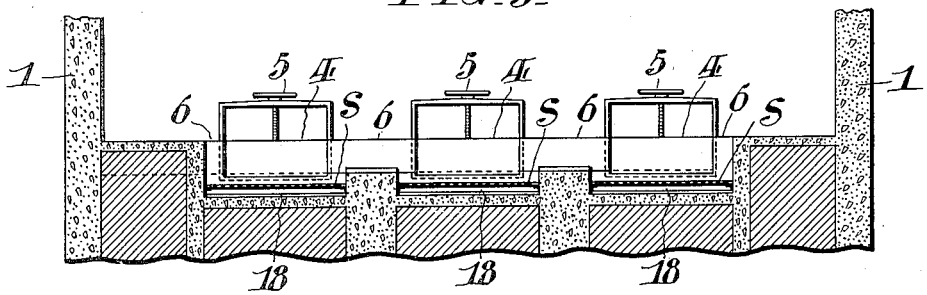
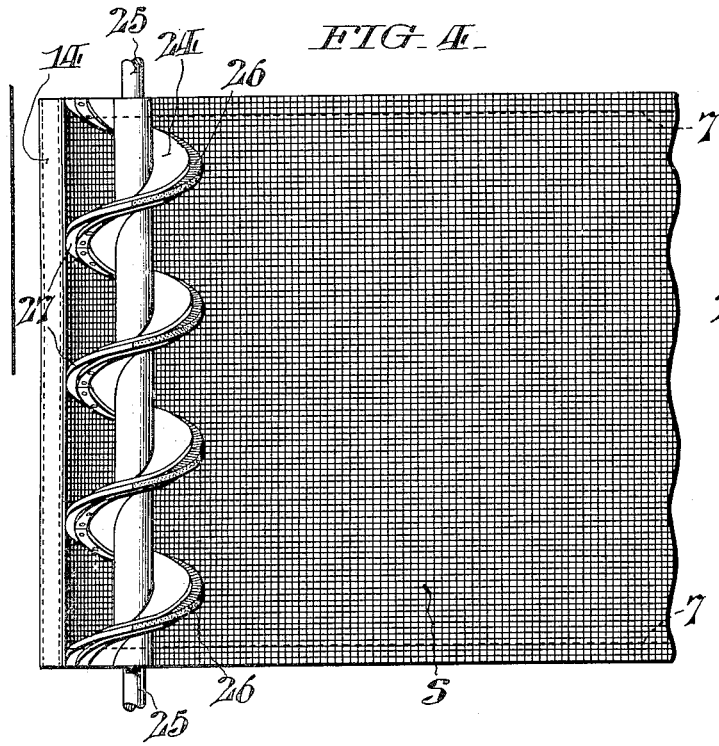
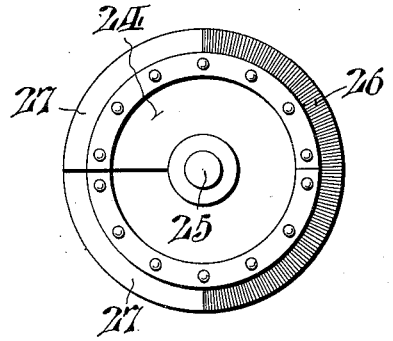
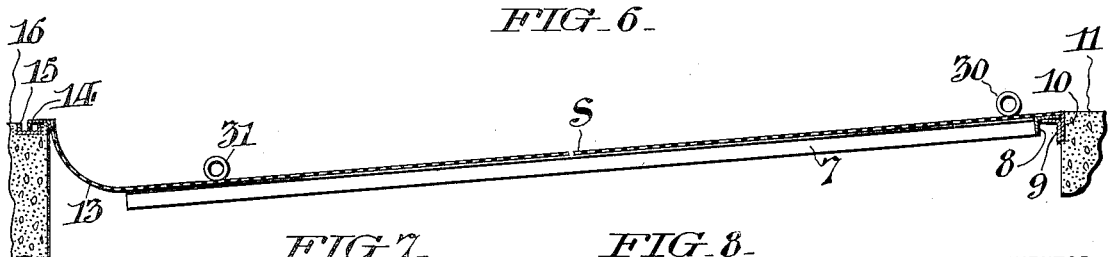
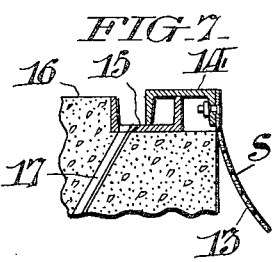
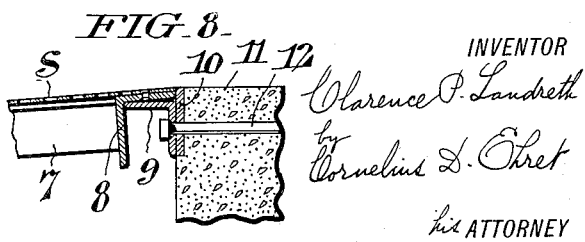

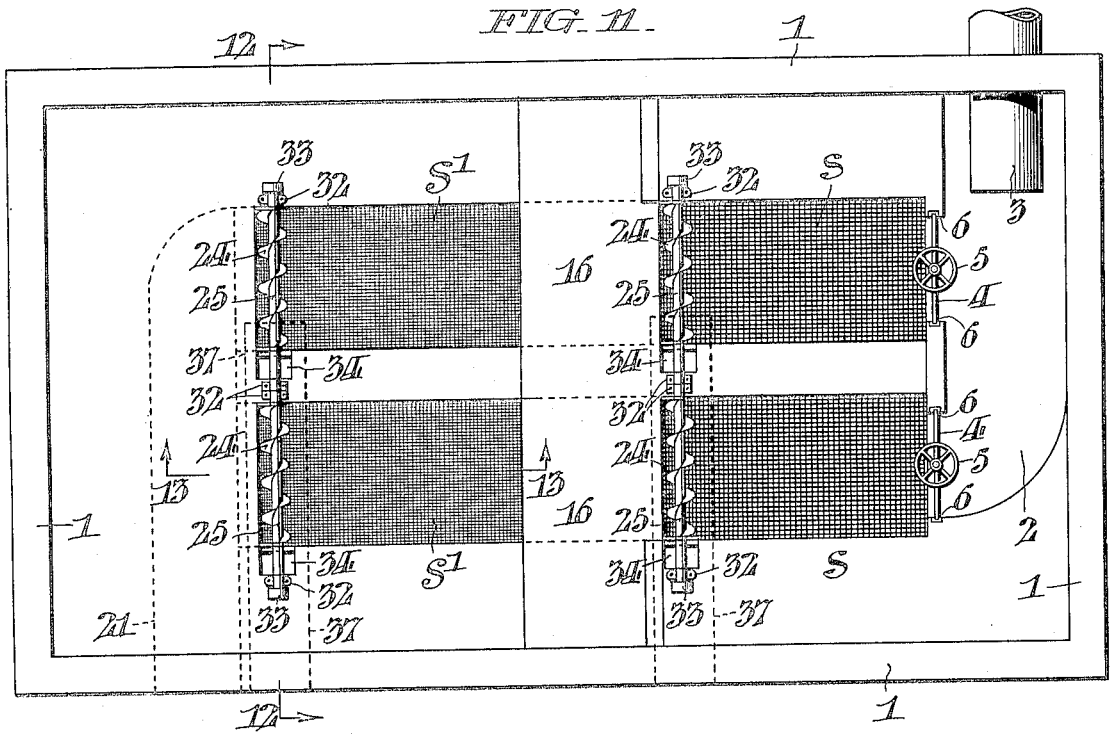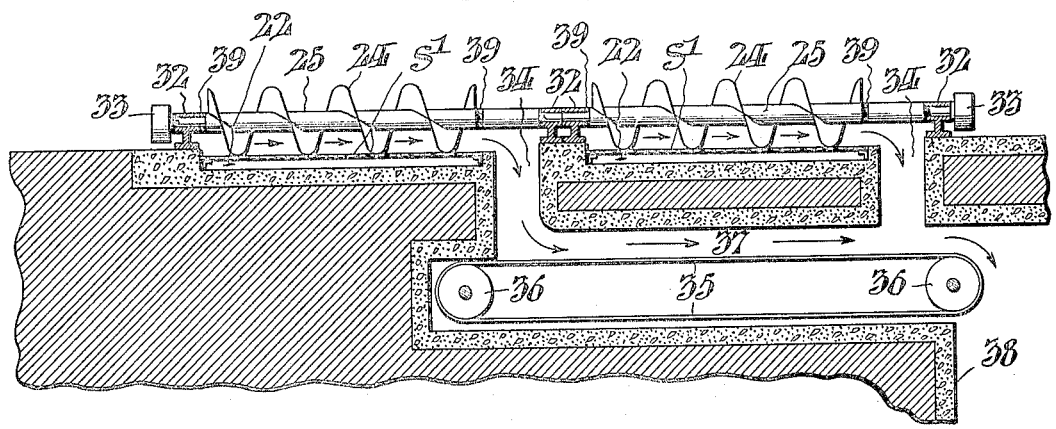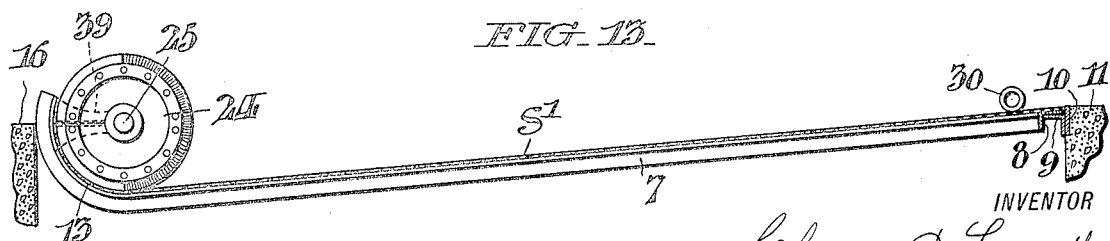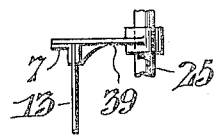

UNITED STATES PATENT OFFICE.

CLARENCE P. LANDRETH, OF PHILADELPHIA, PENNSYLVANIA.

APPARATUS FOR TREATING SEWAGE OR THE LIKE.

1,412,945.  Specification of Letters Patent.  Patented Apr. 18, 1922.

Application filed March 16, 1918. Serial No. 222,830.

*To all whom it may concern:*

Be it known that I, CLARENCE P. LANDRETH, a citizen of the United States, residing in the city and county of Philadelphia, State of Pennsylvania, have invented certain new and useful Improvements in Apparatus for Treating Sewage or the like, of which the following is a specification.

My invention relates to apparatus for separating from sewage, trade waste or similar liquid the solids and semi-solids in suspension therein.

My invention resides in apparatus for treating sewage or liquid of similar character which comprises means for passing the liquid containing the solids and semi-solids along the surface of a screen at suitable velocity for causing the liquid to pass therethrough while the retained solids and semi-solids pass along the screen without materially entering into or clogging the perforations of the same and accumulate at an end thereof, and removing the accumulated solids and semi-solids.

My invention resides also in apparatus of the character referred to in which the liquid from the first screen together with such solids and semi-solids which have passed therethrough are passed along the surface of one or more further screens at such velocity that the contained solids and semi-solids do not materially clog the same and are accumulated at the end thereof, and removed.

My invention resides also in apparatus comprising a self-cleaning screen or series of screens downwardly inclined to cause the liquid and its contents to flow at suitable rate along the surface of the same, whereby the solids and semi-solids are accumulated at the lower end of the screen, the liquid passing through the screen, and the solids and semi-solids being retained or accumulated by means of structure whereby they are drained and disposed suitably for removal either by hand or by continuously operating mechanism.

My invention resides also in further structural features hereinafter described and claimed.

For an illustration of one of the modes of carrying out my method and for an illustration of one of the various forms my apparatus may take, reference is to be had to the accompanying drawings, in which:

Fig. 1 is a plan view of sewage treating apparatus embodying my invention.

Fig. 2 is a cross sectional view on the line 2—2 of Fig. 1.

Fig. 3 is a cross sectional view taken on the line 3—3 of Fig. 1.

Fig. 4 is a fragmentary plan view of a screen with associated sludge removing apparatus.

Fig. 5 is an end elevational view of the sludge removing means of Fig. 4.

Fig. 6 is a cross sectional view, on enlarged scale, of a screen.

Fig. 7 is a fragmentary sectional view showing structure of screen mounting.

Fig. 8 is a fragmentary sectional view showing screen mounting structure at the other end of the screen.

Fig. 9 is a fragmentary plan view of part of one of the screens.

Fig. 10 is a fragmentary plan view of a part of another of the screens.

Fig. 11 is a plan view of apparatus similar to that shown in Fig. 1 with the application of sludge removing mechanism.

Fig. 12 is a vertical sectional view on the line 12—12 of Fig. 11.

Fig. 13 is a cross sectional view, on enlarged scale, taken on the line 13—13 of Fig. 11.

Fig. 14 is a fragmentary plan view of means supporting one end of the screen in Fig. 13.

Referring to the drawings, 1 represents the walls of a building within which is the influent flume 2 into which sewage or similar liquid to be screened is delivered through the pipe 3. The screens S, of any desired or suitable number, are disposed side by side with one end of each lying adjacent the edge of the bottom of the flume 2, communication between the flume and each of the screens being provided by a gate 4 raised and lowered by hand wheel 5, the gate being guided for vertical movement in the abutments 6 forming part of a wall of the flume 2.

As seen in Fig. 6, screen S has extending along its sides the angle irons 7 for supporting or stiffening the same. Extending transversely of the screen at its one end is the angle iron 8 which rests upon an angle iron 9, secured against the plate 10 held in the concrete work or masonry 11, as by an anchor bolt 12 passing through both angle iron 9 and plate 10, as indicated in Fig. 8. At its other end the screen is suitably formed, as at 13, to extend or curve upwardly to form a sludge receptacle, the screen at its end being secured to a transversely extending channel iron 14 hooked to or interlocking with the channel iron 15, carried by the concrete or other platform 16, as by anchor bolt 17, Fig. 7.

The screen S is inclined downwardly away from the flume 2, as indicated in Figs. 2 and 6, and beneath the screen and spaced therefrom is the concrete or other flume bottom or chute 18, also inclined downwardly away from the flume 2 and separated from and spaced below the cleaning platform 16, whereby a passage 19 is formed delivering on to a second screen $S^1$, also preferably constructed and mounted like screen S. The higher end of each screen $S^1$ communicates practically flush with the lower end of the flume bottom 18 and is inclined downwardly therefrom, its other end being supported, as in Fig. 7, upon the cleaning platform 20, beneath which is the effluent flume 21 having the discharge outlet $21^a$. Spaced below each screen $S^1$ is the flume bottom or chute 22, preferably inclined toward the flume 21 and extending under and spaced from the platform 20 to form the passage 23 into the flume 21.

Referring to Figs. 4, 5 and 11 to 14 inclusive, there extends transversely of each of the screens S and $S^1$, or any of them, an Archimedean screw 24 mounted upon the shaft 25 having bearings 32 and rotated by any suitable means, as pulleys 33 driven from a countershaft or the like.

On a part, as for example half, of each turn or convolution of the screw 24 is mounted a brush or series of small brushes 26, and on the other part is secured an outwardly extending rib or flap of rubber or other flexible and preferably continuous material serving as a wiper, the brushes and wipers alternating throughout the length of the screw, as indicated in Fig. 4. Or the periphery of the screw 24 may be entirely occupied by brushes alone or entirely by wipers alone.

As shown in Figs. 11 and 12, the arrangement of the screens and their cooperation is that described in connection with Figs. 1 and 2. In addition, however, there is disposed at the lower end of each screen approximate the screw 24 and at one side of the screen a downwardly extending passage 34 into which the screw 24 delivers the solids and semi-solids accumulated at the lower end of the screen. The matter falling through the passages 34 is received on a conveyer of any suitable type, for example, a belt type conveyer 35 running upon the wheels or pulleys 36 driven by any suitable source of power. The conveyer 35 is located in a chamber 37 beneath the screens and at one end of the chamber 37 is a pit 38 into which the material received upon the conveyer 35 is delivered.

As shown in Figs. 13 and 14, there is attached to the end of the screen at each side thereof, preferably at the end of the arcuate portion 13 of the screen, a bracket 39 pivoted upon the shaft 25. By this structure the screen may be lifted as by hoisting upon the eye bolts 30 at the opposite end, the screen as a whole then partaking of pivotal movement upon the shaft 25, while the other end of the screen is raised upwardly for access to the under side of the screen to the channel or chute 18 or 22 below the same.

By the screw structure described, the sludge accumulated at the lower end of the screen is continuously removed by the brushes and wipers, discharged through the passages 34 on to the conveyer 35, which ultimately discharges the material into the pit 38.

While I prefer the screw structure above described, it will be understood that any other suitable or convenient means may be employed for removing the sludge collected at the lower end of the screen.

Each screen S is preferably made of a plate or sheet of metal having large perforations, for example circular perforations 28, as indicated in Fig. 10. And each screen $S^1$ is preferably made of a sheet or plate of metal having the smaller and preferably elongated slots, as 29, as indicated in Fig. 9. In any event, each screen S is preferably a coarse screen, while the associated or following screen $S^1$ is a finer screen.

The mode of operation is as follows:

The sewage or like material delivered by the pipe 3 into the flume 2 flows under a raised gate 4 on to the upper end of a screen S, the liquid flowing quite rapidly along the upper surface of the screen, the liquid and some of the finer solid or semi-solid content falling through the perforations on to the chute or flume bottom 18, while the coarser material is retained upon the screen and by the flow of the liquid thereover is carried along the screen to its end 13, where it accumulates and any liquid reaching the end 13 with the retained material, as sludge, drawing out therefrom into the flume 18. By this action the direction of flow of the liquid to be screened is along and substantially parallel to the surface of the screen, as distinguished from flowing in a direction normal to that surface or at a substantial or great angle with respect to that surface. In consequence of this operation, the sludge or matter retained upon the screen does not readily lodge in and clog the perforations thereof, because the direction of flow of liquid is such as to carry the sludge along the screen surface, and the direction of flow is not such as to carry the sludge into the screen perforations.

The sludge accumulating at the lower end of each screen S may be removed manually or otherwise on to the closely adjacent platform 16, from which it may be carted or carried away. However, when screw apparatus of the character described is employed, the rotation of the screw carries the accumulated sludge transversely of the screen, the brushes acting on the screen to free the sludge therefrom, and the rubber or flexible wiper 27 advancing it along the screen and delivering it to one side thereof, both the brush 26 and the wiper 27 serving to dislodge the accumulated matter from the screen and to advance it laterally across and off from the same, and delivered into pit 38 as hereinbefore described. Both the brush structure and the wiper structure closely engage the arcuate end 13 of the screen.

The liquid and finer material in suspension therein which pass through the screen S is caught upon the flume bottom 18 and flows downwardly along the same through the passage 19 on to the upper end of the associated screen $S^1$, where by action similar to that above described, the solid or semi-solid material is retained and moved along the surface of the screen by the action of the rapid flow of the liquid and accumulated at the lower end of the screen, where it may be moved by hand or otherwise on to the platform 20 or may be removed by screw apparatus such as indicated in Fig. 4 or by equivalent means. The liquid passing through the screen $S^1$ is received upon the flume bottom 22, along which it flows through the passage 23 into the effluent flume 21 from which it is discharged at $21^a$. The action on each of the screens is in effect a self-cleaning operation in that neither screen becomes clogged, or in any event, becomes clogged only after a very considerable time, in which event it may be cleaned by delivering on to it water from a hose or the like.

Each of the screens may be raised, as by attachment of chain or other hoist to the eye-bolts 30 or 31, Fig. 6, disposed at opposite ends of the screen. If the screen is to be raised about its lower end, it is lifted by the eye-bolts 30 at its upper end; and conversely, if it is to be raised about its upper end, it is raised by the eye-bolts 31 near its lower end. In Fig. 2 the dotted line positions of the screens S and $S^1$ indicate how they may be raised, either for cleaning or for access to the flume bottoms 18 and 22. And where the screw 24 is employed, the screen is raised while rotating it at its lower end on the shaft 25.

While I have shown only two screens S and $S^1$ in series, it will be understood that any number of screens may be similarly disposed in series, depending upon the degree to which it is desired to remove solids or semi-solids from the sewage or similar liquid.

What I claim is:

1. Apparatus for separating from sewage or the like solids and semi-solids contained therein comprising a downwardly inclined screen, means for delivering the liquid to the upper end of the screen, means at the other end of the screen for accumulating the separated material, a second downwardly inclined screen, a platform between said screens, and means for delivering to the upper end of said second screen the material passing through said first named screen comprising a liquid passage under said platform.

2. Apparatus for separating from sewage or the like solids and semi-solids contained therein comprising a downwardly inclined screen, means for delivering the liquid to the upper end of the screen, means at the other end of the screen for accumulating the separated material, a second downwardly inclined screen, means for delivering to the upper end thereof the material passing through said first named screen, and a platform between said screens.

3. Apparatus for separating from sewage or the like solids and semi-solids contained therein comprising a downwardly inclined screen, means for delivering the liquid to the upper end thereof, an arcuate upwardly extending surface at the lower end thereof for accumulating separated material, and a rotary screw adjacent said arcuate surface for moving the accumulated material transversely of the screen.

4. Apparatus for separating from sewage or the like solids and semi-solids contained therein comprising a downwardly inclined screen, means for delivering the liquid to the upper end thereof, an arcuate upwardly extending surface at the lower end thereof for accumulating separated material, a rotary screw adjacent said arcuate surface for removing the accumulated material from the screen, and means for supporting the screen coaxially with said screw.

5. Apparatus for separating from sewage or the like solids and semi-solids contained therein comprising a downwardly inclined screen, means for delivering the liquid to the upper end thereof, an arcuate upwardly extending surface at the lower end thereof for accumulating separated material, a rotary screw adjacent said arcuate surface for removing the accumulated material from the screen, means for supporting said screen at its one end coaxially with said screw, and a support upon which rests the other end of said screen, whereby said screen may be raised at its said other end while partaking of pivotal movement about the axis of said screw.

6. Apparatus for separating from sewage or the like solids and semi-solids contained therein comprising a downwardly inclined screen, means for delivering the liquid to the upper end thereof, an arcuate upwardly extending surface at the lower end thereof for accumulating separated material, and a rotary screw adjacent said arcuate surface for moving the accumulated material transversely of the screen, said screw having a brush on its periphery.

7. Apparatus for separating from sewage or the like solids and semi-solids contained therein comprising a downwardly inclined screen, means for delivering the liquid to the upper end thereof, an arcuate upwardly extending surface at the lower end thereof for accumulating separated material, and a rotary screw adjacent said arcuate surface for moving the accumulated material transversely of the screen, said screw having on its periphery a flexible screen-engaging wiper.

8. Apparatus for separating from sewage or the like solids and semi-solids contained therein comprising a downwardly inclined screen, means for delivering the liquid to the upper end thereof, an arcuate upwardly extending surface at the lower end thereof for accumulating separated material, and a rotary screw adjacent said arcuate surface for moving the accumulated material transversely of the screen, said screw having on its periphery alternating portions of brush and wiper members.

9. Apparatus for separating from sewage or the like solids and semi-solids contained therein comprising a downwardly extending screen, means for delivering the liquid to the upper end thereof, means at the lower end of said screen for accumulating the separated material, means for removing the accumulated material from the screen, and a conveyer beneath said screen to which said material is delivered.

10. Apparatus for separating from sewage or the like solids and semi-solids contained therein comprising downwardly inclined screens, means for delivering liquid to the upper ends thereof, means at the lower ends of said screens for accumulating the separated material, a conveyer below said screens, and means cooperating with said screens continuously removing the accumulated material therefrom and delivering it to said conveyer.

11. Apparatus for separating from sewage or the like solids or semi-solids contained therein, comprising a downwardly inclined screen having an arcuate upwardly extending portion at the lower end, and a pivotal support for the lower end of the screen.

12. Apparatus for separating from sewage or the like solids and semi-solids contained therein, comprising a plurality of inclined screens arranged in parallel, means at the lower end of each screen for accumulating separated material, controlled means for delivering sewage to the upper ends of said screens, means for removing accumulated material from each of said screens, structure beneath the lower ends of said screens forming a passage for the separated material, and structure adjacent the side of each of said screens forming a passage for delivering to said first named passage the material removed from said screen.

13. Apparatus for separating from sewage or the like solids and semi-solids contained therein, comprising a series of downwardly inclined screens arranged in parallel, means at the lower ends of said screens for accumulating separated material, a flume having controlled outlets for delivering liquid to the upper ends of said screens, means for removing accumulated material from all of said screens simultaneously, a conveyer below said screens receiving said material, a second series of downwardly inclined screens arranged in parallel, means for delivering to the upper end thereof the liquid passing through said first named series of screens, and a platform between said lower end of said first named series of screens and the upper end of said second named series of screens.

In testimony whereof I have hereunto affixed my signature this 12th day of March, 1918.

CLARENCE P. LANDRETH.